Figure 1:
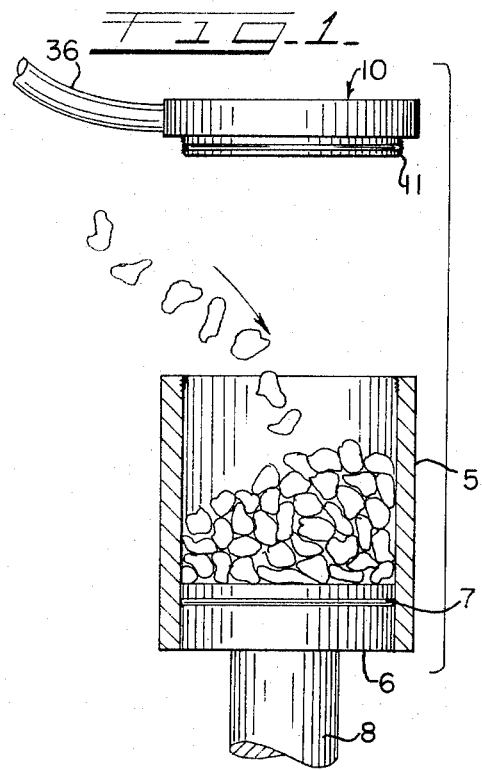
Figure 2:
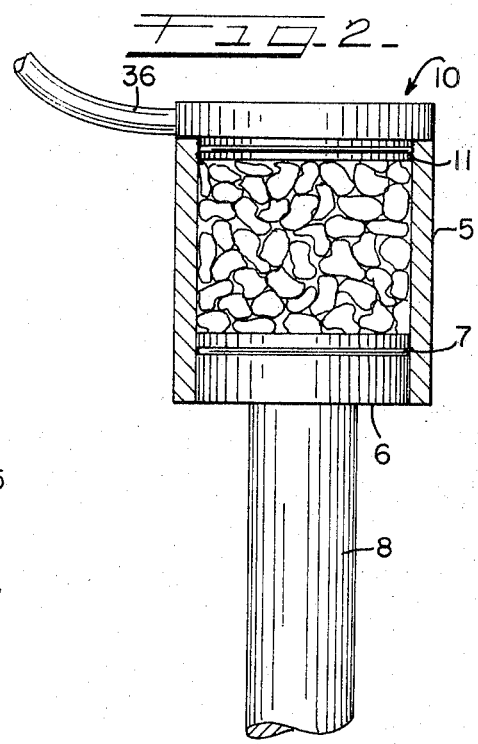
Figure 3:
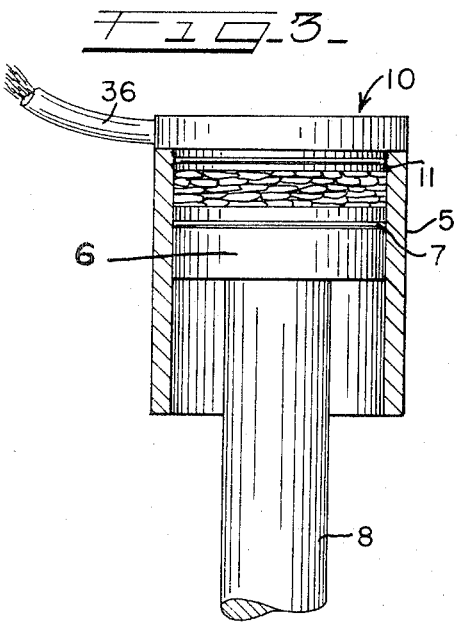
Figure 4:
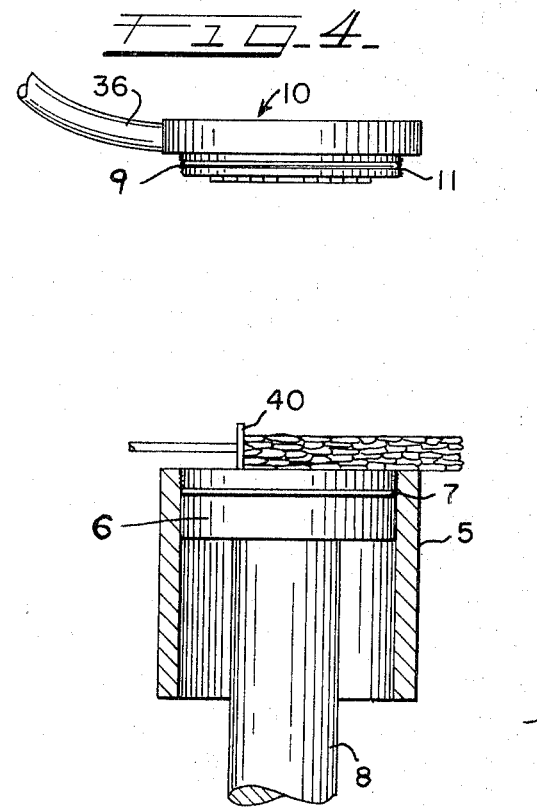

United States Patent [19]
Engelhardt et al.

[11] 3,841,569
[45] Oct. 15, 1974

[54] SEPARATING MEAT FROM BONES

[75] Inventors: John Nicol Engelhardt, Davenport;
Roy Settle Rousseau, Bettendorf, both of Iowa

[73] Assignee: The Kartridg Pak Co., Davenport, Iowa

[22] Filed: Nov. 20, 1972

[21] Appl. No.: 307,959

[52] U.S. Cl............................. 241/4, 17/46, 241/68
[51] Int. Cl............................................. B02c 19/12
[58] Field of Search............... 17/1 G, 46, 45, 56, 1; 241/68, 4, 1, 84.3, 84.4

[56] References Cited
UNITED STATES PATENTS

| | | | |
|---|---|---|---|
| 3,266,542 | 8/1966 | Paoli | 17/1 G X |
| 3,396,768 | 8/1968 | Kurihara | 17/1 G X |
| 3,471,299 | 10/1969 | Duckworth et al. | 17/1 G X |

Primary Examiner—Hugh R. Chamblee
Attorney, Agent, or Firm—Lockwood, Dewey, Zickert & Alex

[57] ABSTRACT

Small fragments or pieces of bone with meat attached thereto are loaded as a mass into a compression chamber provided with a piston entering from one end and a foraminous wall at the opposite end. The piston is advanced toward the foraminous wall until the volume and compressibility of the mass are both substantially reduced. During compression the meat extrudes in fluidized form through the foramina leaving a press cake the meat content of which is substantially reduced from that of the mass introduced into the compression chamber. The calcium content of the extruded meat is not substantially or objectionably increased as a result of the compression action. For example, the calcium content is held below the permissible level, e.g., 1 percent by weight bone equivalent for red meats.

7 Claims, 6 Drawing Figures

PATENTED OCT 15 1974 3,841,569

SHEET 1 OF 2

3,841,569

SEPARATING MEAT FROM BONES

The invention relates generally to innovations and improvements in the removal or recovery of meat from bones without substantial or objectionable increase in the calcium content of the removed and recovered meat. The meat may be raw (i.e., undenatured) or cooked. More specifically, the invention relates to an improved method whereby such a separation of meat from bone fragments or small bones occurs with the means being in the form of a compression chamber provided by a cylinder or sleeve member equipped with a piston entering, and reciprocal from, one end with the end wall opposite the piston being foraminous. The method includes compression of a mass of bone pieces or fragments with meat attached or adhering thereto to a substantially reduced volume as the meat separates and extrudes through the foramina leaving the bone pieces or fragments compacted into a dense relatively incompressible press cake.

The method is characterized by an absence of substantial movement of bone pieces or fragments in contact with a foraminous surface. The bone pieces or fragments that do engage the foraminous surface as the result of the compression of the bone pieces or fragments do not tend to move across the foramina so as to be subjected to mechanical working action resulting in removal of bone material which is taken into the separated meat.

Trimmed bones are an unavoidable by-product of conventional slaughtering and carcass processing operations. They contain amounts up to 40 percent by weight of meat depending on how carefully the trimming has been performed and the type of bone. Even with efficient mechanical trimming aids such as the Whizard knife, it is normally uneconomical to remove more of the meat from the bones because of the high labor cost. While it has long been recognized that trimmed bones constitute a potentially low cost source of undenatured meat that could be used in the production of sausage, meat loaf products and the like and various techniques and apparatus have been proposed and used to some extent in de-meating bones, such methods and apparatus have not been adequately successful for one reason or the other.

The object of the present invention, generally stated, is the provision of novel and improved de-meating method and apparatus for economically removing and recovering a substantial portion of the residual meat from trimmed bones in the form of a fluidized meat mass in which the calcium content is not substantially or objectionably increased and which may be used as part of the meat content of all-meat sausages, meat loaves and similar products.

A further object of the invention is to utilize the foregoing novel improved method and apparatus for de-meating trimmed bones to de-meat bony portions of carcasses which have not been trimmed such for example as neck bones, back bones, blade bones, tail bones, etc. Such bony carcass portions contain relatively small proportions of meat normally not justifying the labor cost required for trimming.

Certain other more specific objects of the present invention will in part be obvious and will in part appear hereinafter.

Figure 5:
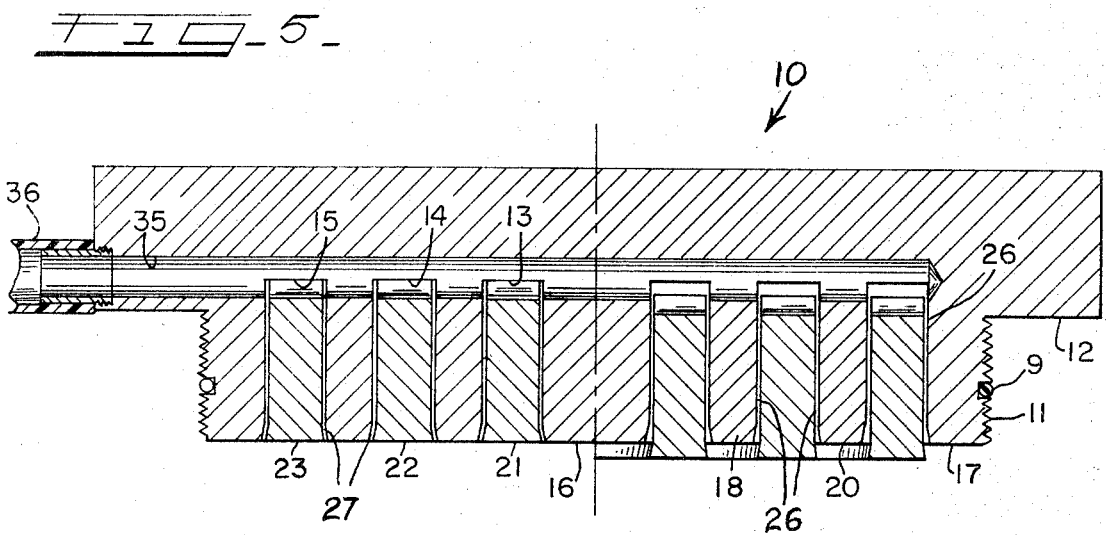
Figure 6:
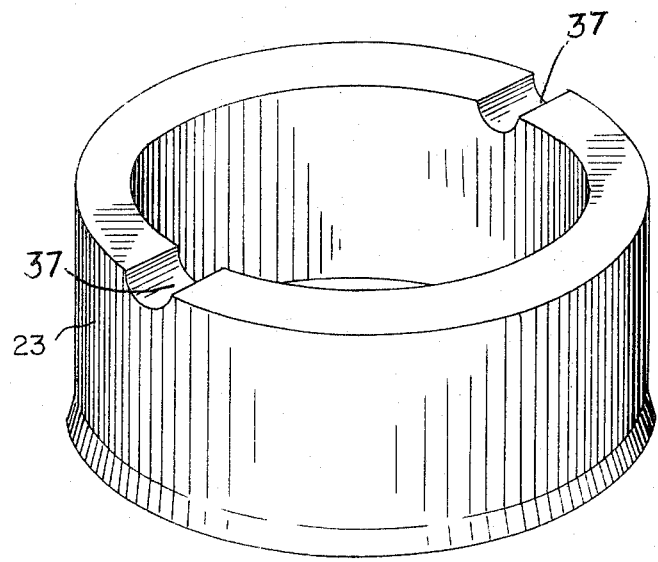

For a more complete understanding of the nature and scope of the present invention, reference may now be had to the following detailed description thereof taken in connection with the accompanying drawing, wherein:

FIGS. 1–4 constitute a series of partially diagrammatic views illustrating the steps of the present method and showing suitable apparatus for carrying out the same;

FIG. 5 is a diametric sectional view on enlarged scale of the extruder block which constitutes the novel portion of the apparatus; and FIG. 6 is a perspective view of one of the outer movable annular rings of the extruder block.

Trimmed bones or bony carcass portions bearing meat, either raw (i.e., undenatured) or cooked, which is not economically removable by conventional de-boning methods are first broken or reduced in size in such manner as to eliminate or at least minimize production of tiny particles or splinters. The bones to be processed are desirably broken into pieces or fragments ranging in from ¼ inch to ¾ inch in diameter and from ½ inch to 1½ inches in length. Preferably, the pieces or fragments do not exceed about ⅝ inch in diameter and 1 inch in length. Such broken trimmed bones or carcass bones with small amounts of meat thereon, are loaded into the cylinder of a press strong enough to withstand internal pressure in the order of 10,000 psig. For example, for pilot plant operations the cylinder 5 in FIGS. 1–4 may have an internal diameter of 7½ inches with side walls 1½ inches thick. The length of the cylinder 5 with these dimensions may be 10 inches. In commercial production larger capacity units will be used.

The cylinder 5 is equipped with a ram or piston 6 having one or more O-ring seals 7. A piston rod or connecting rod 8 projects from the piston 6 and this may be actuated or driven in any suitable means such as by a hydraulic power cylinder or mechanically by a motorized screw, as will be well understood by those skilled in the art.

The open end of the cylinder 5 opposite the piston 6 after being loaded is closed by an extruder block 10 which may have an exteriorly threaded cylindrical plug portion 11 adapted to screw into the internally threaded end of the cylinder 5. The sealing action of the threads is improved by providing an O-ring seal 9 on the plug portion 11. It will be understood that other means may be used for securely fastening the extruder block on or into the piston 5 such as quick-acting external clamps of known type.

Referring to FIGS. 5 and 6, the extruder block 10 includes a base portion 12 in addition to the threaded plug portion 11. A plurality of concentric annular recesses 13, 14 and 15 are formed in the plug portion 11 leaving a center core 16, an outer ring or cylindrical wall 17, and intermediate cylindrical rings or partitions 18 and 20. The annular recesses 13, 14 and 15 are provided with separate interfitting rings 21, 22 and 23, respectively, ring 23 being shown in perspective in FIG. 6.

It will be seen that each ring 21, 22 and 23 is provided with a short outwardly flared or beveled outer end portion matingly received with small clearance on opposite sides in correspondingly outwardly flared or beveled entrances into the annular recesses or well 13, 14 and 15, respectively. The width of each ring 21, 22 and 23 for the most of the axial length thereof is slightly less than the width of its corresponding annular recess 13, 14 and 15, respectively so as to provide a small clearance on each side of the rings 21, 22 and 23 as indicated at 26—26. The side clearances 26 will be appreciably greater than the clearances between the outwardly flared outer ends of the rings and the outwardly flared entrances into the recesses. For example, the side clearances 26 may be in the order of 0.0625 inch while clearances 27—27 in the flared areas may be in the order of 0.015 inch.

It will be seen that the extruder block 10 provides a foraminous end wall in which the foramina are in the form of the narrow annular clearances 27—27.

At least one fluidized meat discharge or outlet passageway 35 is formed as by drilling in the extruder block base portion 12 so as to communicate with the inner end of each of the annular recesses 13, 14 and 15 and allow for the discharge of fluidized meat squeezed through the clearances between the mating surfaces of the rings 16, 22 and 23 and the annular recesses 13, 14 and 15, respectively. If desired, more than one passageway 35 may be provided and each will be provided at its outer end with a suitable discharge conduit 36. Each ring 21, 22 and 23 has diametric grooves 37—37 in the inner end which may be formed during the drilling of outlet bore 35.

Referring again to FIGS. 1-4, after the empty cylinder 5 with the retracted piston 6 has been filled with a mass of broken trimmed bones as indicated diagrammatically in FIG. 1, the extruder block 10 is screwed in place and pressure is exerted on the piston 6 through the connecting rod 8. It will be apparent that the mass of bones within the cylinder 5 will be compressed toward the extruder block 10.

As the piston 6 advances toward the extruder block 10, the mass of bone fragments and pieces becomes increasingly compressed together and the residual meat attached to the bone pieces or particles or fragments to an increasing extent takes a fluidized form and discharges through the small annular clearances or foramina 27—27 provided by the extruder block 10. These clearances are sufficiently small to prevent entrance of bone particles. Some size reduction and crushing action may occur as the mass of fragments and pieces of bone is compressed within the cylinder 5. The reduction in the volume of the mass is the result of several factors including the removal of the adherent or residual meat from the bone fragments, the compaction of the bone pieces or fragments into a mass with less space therebetween and in part to any crushing that may take place. In the early stages of the compression action the piston 6 advances relatively rapidly and the hydrostatic pressure within the cylinder 5 will be relatively low. However, as the piston face approaches the foraminous surface provided by the inner face of the extruder block 10 the movement of the piston is increasingly retarded and the hydrostatic pressure rises rapidly. Typically, the reduction in the volume of the mass of broken bones is in the order of 80 percent based on the original volume with the final compaction being illustrated in FIG. 3. At approximately this point the advancing force on the piston 6 is discontinued and then the piston may be slightly backed off to facilitate the opening of the cylinder 5 and removal of the extruder block 10. After the extruder block 10 has been removed, the piston 6 is again advanced so that the face is even with the end of the cylinder 5 whereupon the compacted mass of bones may be scraped off by a manual or machine operated scraper as indicated at 40.

The following examples will serve to illustrate further the nature and scope of the invention.

Example I

Three pounds of trimmed hog carcass bones having residual raw or undenatured meat thereon are reduced to approximately ⅜ inch in diameter by 1 inch long pieces or fragments in a bone breaker (e.g., Rietz Extructor) or other commercially available bone breaking apparatus. In this mass of bones the larger pieces may measure approximately 1½ inches long while the smaller pieces may measure approximately ½ inch. The resultant mass of broken bones is loaded into the cylinder 5 of the press and the piston 6 advanced toward the extruder block 10. Initially the hydraulic pressure may be such as to apply force of 16,600 pounds on the piston 8 thereby creating a hydrostatic pressure of 1,730 psig. at the face at the inner surface of the piston 6. Initially the piston 6 advances at the rate of 23 inches per second. Fluidized meat begins to extrude through the tube 36 after the piston 6 has moved or advanced approximately 3 inches at which time the hydrostatic pressure has risen to approximately 2,000 psig. The advancement of the piston 6 is discontinued when the hydrostatic pressure reaches approximately 11,000 psig. at which time the rate of advance is reduced to about 0.7 inch per second. After the press is opened the press cake of de-meated bones has a depth of about 1 inch and weighs about 1½ pounds giving it a density of 59 pounds per cubic foot. Typically, 1½ pounds of fluidized meat are removed from the bones during the pressing operation.

It will be appreciated that other equipment may be used for carrying out the method of de-meating bones. Thus, the side wall of a press cylinder may be provided with foramina adjacent one end so that the fluidized meat extrudes through the side wall. The piston of a press may be provided with foramina. The foramina may take various forms other than annular.

If desired, the cylinder 5 may be jacketed and the piston 6 may be chambered so that water or other liquid may be circulated therethrough for controlling, i.e., cooling or heating, the temperature of the mass of bone pieces or fragments within the chamber.

We claim:

1. The method of separating attached meat from a mass of bone pieces or small bones which comprises, compressing said mass in a means providing a chamber essentially in a single direction to a substantially reduced volume, collecting the meat which extrudes from said mass through a means provided with a foraminous surface during said compression and removing the resultant press cake the meat content of which has been substantially reduced, only the bone pieces or small bones at the surface of said press cake proximate to said foraminous surface having direct engagement with said foraminous surface and with said engagement being essentially normal to said foraminous surface without substantial working action against said surface.

2. The method of claim 1 wherein said bone pieces are formed by breaking trimmed bones.

3. The method of claim 1 wherein said small bones comprise bony carcass components.

4. The method of claim 1 wherein said extruded meat is not substantially increased with respect to a normal calcium content of said meat.

5. The method of separating attached meat from bone fragments and particles which comprises, compressing a mass of said bone fragments and particles within a strong-walled chamber means one wall of which is formed by a piston and at least a substantial portion of a wall surface opposing said piston is foraminous with the foramina being appreciably smaller than said bone fragments and particles, said piston and said foraminous surface of said wall being advanced relative to each other until the compressibility of said mass has been substantially reduced, collecting the meat which extrudes through said foramina of said wall and removing the resultant press cake from said chamber, only the bone fragments and particles at the surface of said press cake proximate to said foraminous surface having direct engagement with said foraminous surface and with said engagement being essentially normal to said foraminous surface without substantial working action against said surface.

6. The method of claim 5 wherein during the compression of said mass the hydrostatic pressure on said mass increases several fold while the rate of relative advance of said piston and foraminous surface toward each other decreases several fold.

7. The method of claim 5 wherein said meat attached to the bone is raw, it is not denatured during the process, and the calcium content of said extruded meat is not substantially increased with respect to the normal calcium content of said meat.

* * * * *